Dec. 13, 1949 W. H. MILBRATH ET AL 2,490,977
VALVE SEAT REAMER
Filed Dec. 26, 1944
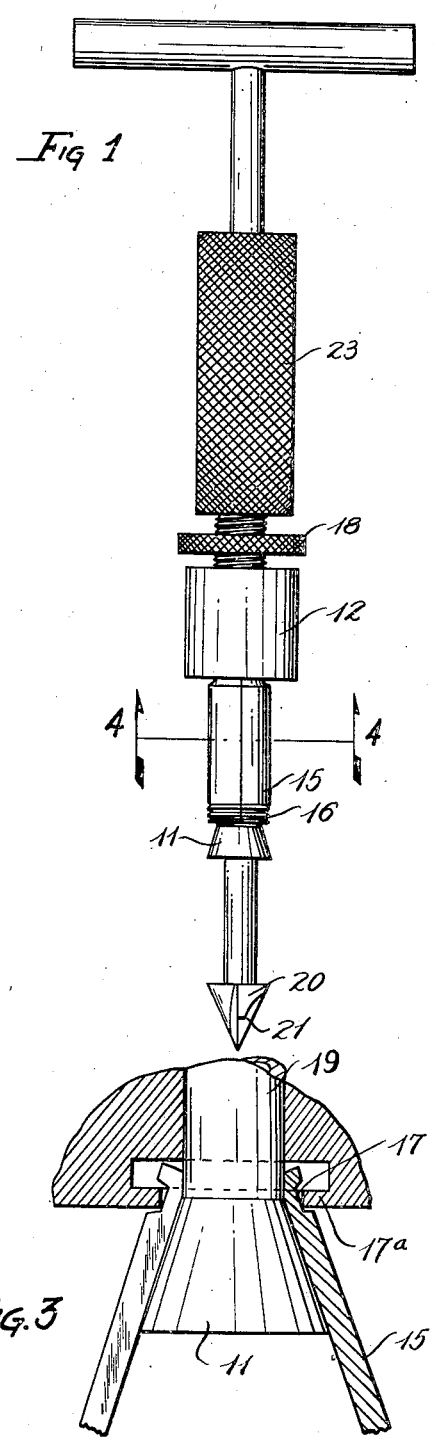
Fig. 1
Fig. 3
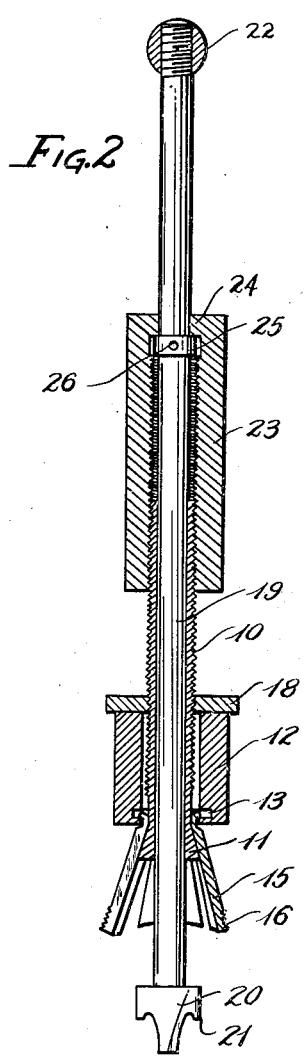
Fig. 2
Fig. 4
INVENTORS
WALTER H. MILBRATH,
COLEMAN HALDA
Hazard & Miller
ATTORNEYS Patented Dec. 13, 1949

2,490,977

UNITED STATES PATENT OFFICE 2,490,977

VALVE SEAT REAMER

Walter H. Milbrath, Los Angeles, and Coleman Halda, Monterey Park, Calif.

Application December 26, 1944, Serial No. 569,762

1 Claim. (Cl. 90—12.5)

This invention relates to improvements in valve seat reamers.

An object of the invention is to provide an improved portable hand operated reamer primarily designed for resurfacing the valve seats of water faucets, toilet valves, and the like. In many such constructions the body of the valve provides a very small opening above the valve seat that is to be refaced or reamed so that in the design of a valve seat reamer, it is necessary to provide a construction which is collapsible and expansible so as to be caused to enter these small openings. The reamer portion of the device consists essentially of a rotatable rod or spindle which carries the surfacing or reaming tool. In association with the rod or spindle a clamping construction is provided which may be expanded into engagement with the interior of the valve body preferably immediately below the threads thereof. The expandible construction must be capable of being contracted into a sufficiently small size so as to enable it to be passed through the small opening in the top of the valve body.

Another object of the present invention is to provide an improved valve seat reamer wherein the expansible construction, which serves to hold or steady the rod or spindle while it is being rotated, is capable of the necessary contraction and which, at the same time is adequately strong to withstand the force to which the reamer may be subjected during its operation.

Another object of the invention is to provide an improved valve seat reamer which is of relatively simple, sturdy, and durable design, which can be economically manufactured and which may be easily manipulated to effect a resurfacing or reaming of valve seats.

With the foregoing and other objects in view, which will be made manifest in the following detailed description and specifically pointed out in the appended claim, reference is had to the accompanying drawings for an illustrative embodiment of the invention, wherein:

Figure 1 is a view in side elevation of the improved valve seat reamer illustrating its expansible construction or chuck in contracted position;

Fig. 2 is a diametrical vertical section through the valve seat reamer shown in Fig. 1, by illustrating the expansible construction or chuck in expanded position;

Fig. 3 is an enlarged partial vertical section through that portion of the tool adjacent the expanding head; and Fig. 4 is a horizontal section taken substantially upon the line 4—4 upon Fig. 1.

Referring to the accompanying drawings wherein similar reference characters designate similar parts throughout, the improved valve seat reamer comprises a hollow externally threaded screw 10 on the lower end of which there is a conical expanding head 11. Around the lower end of the screw 10 there is slidable a collar 12 having an internal annular recess 13 adjacent its lower end. A plurality of jaws 15 are arranged about the lower end of the screw and these jaws preferably have toothed or serrated lower ends indicated at 16. There are preferably three jaws which, as illustrated in Fig. 4, are arcuate in horizontal cross section so as to fit together closely about the screw 10. When these jaws are fully collapsed their overall diameter preferably does not exceed the diameter of the expanding head 11 as illustrated in Fig. 1. The upper ends of the jaws are externally grooved as indicated at 17 to receive a flange 17a on the bottom of collar 12. The portions of the jaws above the flange extend into the recess 13 so as to thus swingably suspend the jaws at their upper ends from the bottom of the collar. The above-described arrangement enables the jaws to assume a collapsed position snugly fitting about the exterior of the screw 10 above the head enabling the device to be inserted in faucets and the like through relatively small openings.

A nut 18 is threaded onto the screw and on being screwed downwardly the nut 18 will force the collar 12 downwardly causing the jaws 15 to pass from their fully contracted position shown in Fig. 1 to their fully expanded position shown in Fig. 2.

A rod or spindle 19 extends through the screw 10 and is rotatable and slidable therein. This rod or spindle carries the cutter or reamer 20 on its lower ends. The cutter or reamer may be of any preferred or conventional design although it preferably has a pilot portion designed to enter the valve seat and to ream it. The radial cutters 21 are designed to face the valve seat. The rod or spindle 19 is rotated by a suitable handle 22.

On the upper end of the screw 10 there is an elongated sleeve for forcing nut 23 having an inwardly extending flange 24 at its top engageable with a shoulder on the rod or spindle 19 preferably provided by a ring 25 that is pinned thereon such as by a pin 26.

The operation and advantages of the improved valve seat reamer are substantially as follows:

With the tool in its fully collapsed position as illustrated in Fig. 1, it may be introduced through the opening in the body of the faucet or toilet valve at the top thereof. The collar 12 may then be caused to slide downwardly carrying with it the jaws 15. These jaws, when they encounter the conical expanding head 11, will be expanded as illustrated in Fig. 2 into engagement with the interior of the valve body preferably below the threads thereof. The bottom of the collar 12 may be positioned against the top of the valve body. By screwing the nut 18 downwardly on the screw 10 the collar 12 may be forced downwardly with considerable force thus expanding the jaws 15 quite firmly into engagement with the valve body to hold the entire structure rigid and stationary. The spindle or rod 19 can then be rotated by means of a handle 22 to ream and face the valve seat and in so doing it is desirable from time to time to screw the sleeve or forcing nut 23 downwardly on screw 10 to cause the flange 24 to engage the shoulder 25 to force the cutter 20 against the valve seat. When the forcing nut is screwed downwardly periodically it merely forces the spindle or rod 19 downwardly with sufficient force to cause the cutter to cut the valve seat during the rotation of the spindle by the handle 22.

It will be appreciated from the above-described construction that the arrangement of the parts is such that they may be collapsed into a relatively small size as illustrated in Fig. 1, thus enabling the reamer to be introduced through the top opening in the valve body even though the top opening may be of very small size. When the refacing or reaming is completed the nut 18 and forcing nut 23 may be backed upwardly to allow the collar 12 to slide upwardly on the screw 10. Nut 18 may then be pushed downwardly causing screw 10 and its expanding head 11 to descend relatively to the jaws. The jaws 15 will then collapse about the screw and the entire tool may be removed.

Various changes may be made in the details of construction without departing from the spirit and scope of the invention as defined by the appended claim.

We claim:

A valve seat reamer comprising a hollow screw having an upwardly tapering expanding head adjacent its lower end, a spindle extending through the screw having reaming means on its lower end and rotating means on its upper end, a collar slidable upon the screw and having an internal recess, a plurality of jaws arcuately shaped in cross section arranged about the screw engageable with the expanding head, said jaws having outwardly extending flanged portions adjacent their upper ends extending into the internal recess in the collar, a first nut threadably mounted on the screw for movement therealong, the first nut being located above the collar so that when threaded downwardly the first nut forces the collar downwardly and the jaws onto the tapered expanding head to expand the jaws, the spindle having a shoulder adjacent its upper end, and a second nut threadably mounted on the screw and engaging the shoulder for forcing the spindle downwardly relative to the screw.

WALTER H. MILBRATH.
COLEMAN HALDA.

REFERENCES CITED

The following references are of record in the file of this patent:

UNITED STATES PATENTS

| Number | Name | Date |
|---|---|---|
| 378,196 | Dunn | Feb. 21, 1888 |
| 766,713 | Loetzer | Aug. 2, 1904 |
| 1,113,674 | Moore | Oct. 13, 1914 |
| 1,905,819 | Doyle | Apr. 25, 1933 |
| 2,106,173 | Hawker | Jan. 25, 1938 |
| 2,302,858 | Hare | Nov. 24, 1942 |
| 2,318,980 | White | May 11, 1943 |

FOREIGN PATENTS

| Number | Country | Date |
|---|---|---|
| 211,595 | Germany | July 8, 1909 |